United States Patent
Wu et al.

(10) Patent No.: US 7,987,423 B2
(45) Date of Patent: Jul. 26, 2011

(54) PERSONALIZED SLIDE SHOW GENERATION

(75) Inventors: Peng Wu, Palo Alto, CA (US); Jian Fan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 11/546,623

(22) Filed: Oct. 11, 2006

(65) Prior Publication Data
US 2008/0092050 A1   Apr. 17, 2008

(51) Int. Cl.
*G06F 3/00* (2006.01)
(52) U.S. Cl. ......... 715/704; 715/730; 715/731; 715/732
(58) Field of Classification Search .......... 715/730–732, 715/201–203, 704
See application file for complete search history.

(56) References Cited

U.S. PATENT DOCUMENTS

| | | | | |
|---|---|---|---|---|
| 5,838,313 A * | 11/1998 | Hou et al. | | 715/201 |
| 5,886,744 A * | 3/1999 | Hannah | | 375/240.16 |
| 6,369,835 B1 * | 4/2002 | Lin | | 715/726 |
| 6,396,500 B1 * | 5/2002 | Qureshi et al. | | 345/473 |
| 6,532,023 B1 * | 3/2003 | Schumacher et al. | | 715/704 |
| 6,834,371 B1 * | 12/2004 | Jensen et al. | | 715/255 |
| 7,358,962 B2 * | 4/2008 | Dehlin et al. | | 345/173 |
| 7,383,509 B2 * | 6/2008 | Foote et al. | | 715/731 |
| 7,505,051 B2 * | 3/2009 | Wang | | 345/660 |
| 2002/0019845 A1 * | 2/2002 | Hariton | | 709/205 |
| 2002/0197593 A1 * | 12/2002 | Sutton | | 434/276 |
| 2004/0091232 A1 * | 5/2004 | Appling, III | | 386/46 |
| 2004/0201610 A1 * | 10/2004 | Rosen et al. | | 345/731 |
| 2005/0034077 A1 * | 2/2005 | Jaeger | | 715/732 |
| 2005/0039129 A1 * | 2/2005 | Paul | | 715/730 |
| 2005/0276495 A1 * | 12/2005 | Youm et al. | | 382/243 |
| 2006/0294467 A1 * | 12/2006 | Auterinen | | 715/723 |
| 2007/0016549 A1 * | 1/2007 | Whitcher | | 707/1 |
| 2007/0038938 A1 * | 2/2007 | Canora et al. | | 715/731 |

FOREIGN PATENT DOCUMENTS

| | | |
|---|---|---|
| WO | 03/023655 A | 3/2003 |
| WO | 03/023657 A | 3/2003 |

OTHER PUBLICATIONS

R. Muller, T. Ottoman; The "Authring on the Fly" system for automated recording and replay of (tele)presentations; spring 2000; Dartmouth College, N.H. USA; p. 169.*

Muller, R et al; "The Authoring on the Fly system for automated recording and replay of (tele)presentations", Multimedia Systems, V.8(3), Oct. 2000.

* cited by examiner

Primary Examiner — Weilun Lo
Assistant Examiner — Phenuel S Salomon (57) ABSTRACT

A personalized slide show generation system is comprised of a script generator and a personalized slide show generation engine. The script generator is configured for employing a user interaction associated with an image to generate an interaction script. The personalized slideshow generation engine is coupled to the script generator and configured for utilizing the image and the interaction script to generate a personalized slide show.

14 Claims, 5 Drawing Sheets

PROVIDING A POSITIONAL INTERACTION INTERFACE ACCESSIBLE FOR RECEIVING A USER INTERACTION FROM A POSITIONAL INTERFACE DEVICE, THE POSITIONAL INTERACTION INTERFACE AVAILABLE CONCURRENTLY WITH A PRESENTATION OF AN IMAGE.
310

GENERATING AN INTERACTION SCRIPT, THE INTERACTION SCRIPT COMPRISING INSTRUCTIONS FOR GENERATING A PERSONALIZED SLIDE SHOW BASED UPON THE USER INTERACTION WITH THE PRESENTED IMAGE.
320

PERSONALIZED SLIDE SHOW GENERATION

TECHNICAL FIELD

Embodiments of the present technology relate to generating slide shows from images. More specifically, embodiments of the present technology relate to generating personalized slide shows from one or more digital images.

BACKGROUND

Slide shows have historically been a popular way to view images. This has been true of film images and it is still true of digital images. With respect to digital images, there are many ways to create a slide show from one or more digital images.

For example, one straightforward way is to allow an image viewer program to access a folder of digital images that are stored for use by a computer or other electronic device. The image viewer program can then open and display, on a display device, each of the digital images in the folder. A drawback to this method is that the presentation will be bland and unpersonalized, with images simply displayed "as is" without meaningful zooming or panning. Yet another way is to use an automated slide show generation program which also automatically determines "salient" content in the digital images, and then displays these "salient" portions of the images in a slide show. This may allow some zooming or panning with respect to image content, but there is no guarantee that the image content deemed as "salient" will have any personal significance to a viewer. Thus, in either of these methods images will typically be displayed for viewing without accentuating image content in a way that has personal significance to the viewer.

Presently, if a user wants to truly personalize a slide show, it takes a good deal of time, effort, and experience with a graphics utility or image viewing utility to format an image or images in a manner desired for display in a slide show. Typically, a variety of menus and editing windows will be used to accomplish this form of manual generation of a slide show. No matter how proficient a person is, this is not a very natural process of interacting with an image.

Furthermore, though this manual method gives a very personalized result, it is time consuming and typically requires editing of the image content, such as by cropping images. A drawback of editing an image is that when an image is edited, the original image is either permanently altered or else storage space is used to store each altered copy of the image for each slide show that the image appears in. Thus, for example, when several members of a family, generate separate personalized slide shows from a group of images, a significant amount of storage space may be consumed to store each personalized slide show. This can quickly consume limited storage space on a device that the slide show is stored upon.

With the rapid rise in use of digital cameras and powerful viewing devices such as personal computers, the need to display digital images in an attractive manner is becoming increasingly prevalent. Slide shows are one way to display digital images and satisfy this need. However, as described, current methods for creating slide shows from digital images either lack personalization, or else have several drawbacks such as requiring a great deal of time, effort, training, or extra storage capacity for storing each personalized slide show.

BRIEF DESCRIPTION OF THE DRAWINGS

The accompanying drawings, which are incorporated in and form a part of this specification, illustrate embodiments of the present technology for personalized slide show generation and, together with the description, serve to explain principles discussed below.

The drawings referred to in this description should not be understood as being drawn to scale unless specifically noted.

DETAILED DESCRIPTION

Reference will now be made in detail to embodiments of the present technology for personalized slide show generation, examples of which are illustrated in the accompanying drawings. While the present technology is described in conjunction with various embodiments, it will be understood that they are not intended to limit the present technology to these embodiments. On the contrary, the presented technology is intended to cover alternatives, modifications and equivalents, which may be included within the spirit and scope the various embodiments as defined by the appended claims. Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present technology.

Unless specifically stated otherwise as apparent from the following discussions, it is appreciated that throughout the present detailed description, discussions utilizing terms such as "employing", "utilizing", "filtering", "converting", "receiving", "generating", "providing", "receiving", "presenting", "recording", "processing", "outputting", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

Example Computer System Environment

Figure 1:
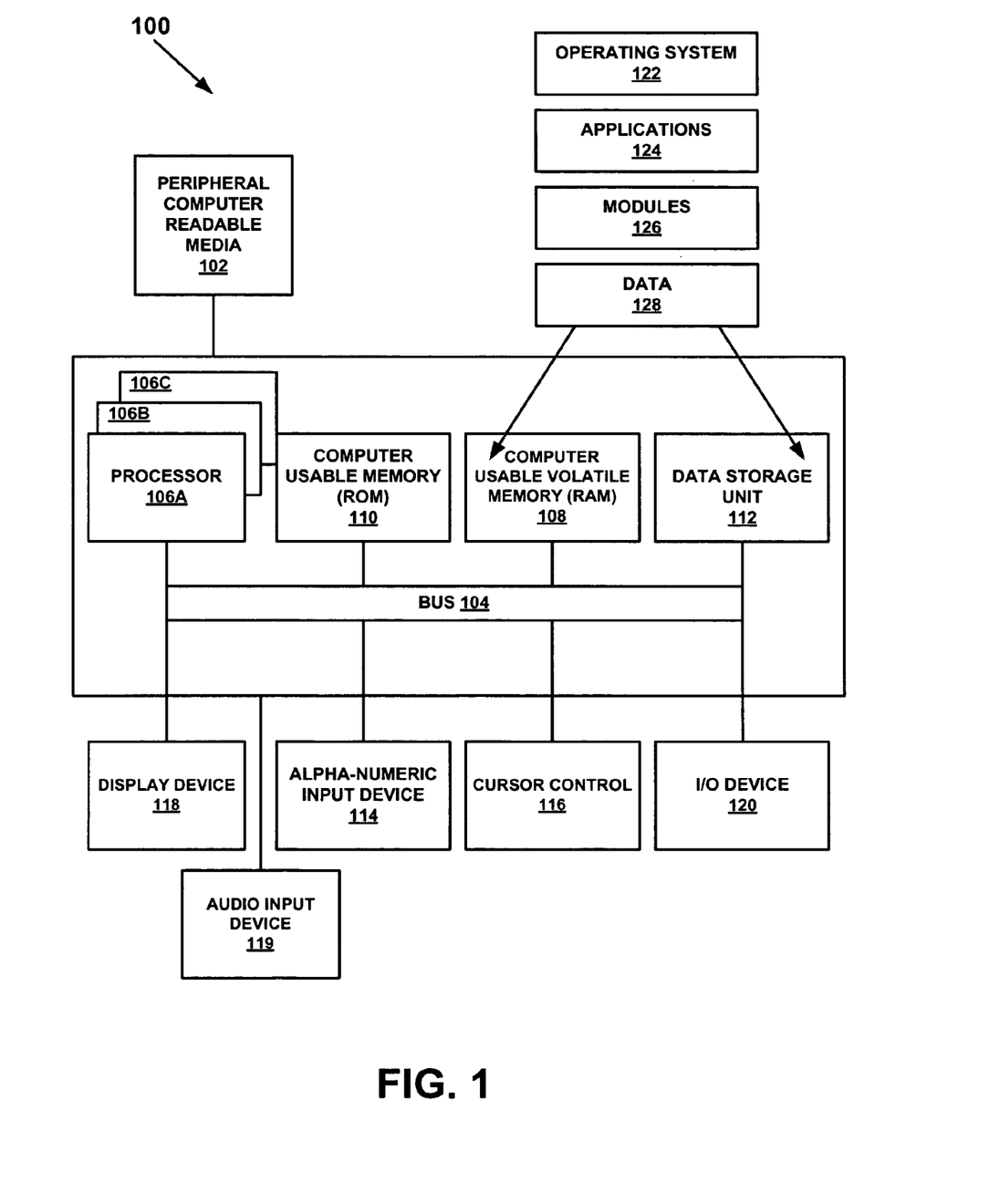
FIG. 1 is a diagram of an example computer system used in accordance with embodiments of the present technology.

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example only, and that the present technology can operate on or within a number of different computer systems including general purpose networked computer systems, embedded computer systems, optical computer systems, virtual computer systems, server devices, client devices, various intermediate devices/nodes, stand alone computer systems, digital cameras, multimedia consoles, multimedia handheld devices, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating graphic images and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands or by interpretation of hand movements.

System 100 of FIG. 1 also optionally includes an audio input device 119, such as a microphone or an audio input jack, for enabling receipt of an audio input such as voice or music. For example, in one embodiment a voice input is received via audio input device 119, processed by an application 124 running on processor 106A, and then stored digitally on data storage unit 112. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology, for example, is stored as an application 124 or module 126 in memory locations within RAM 108 and/or memory areas within data storage unit 112.

General Description of the Present Technology for Personalized Slide Show Generation Overview The present technology for personalized slide show generation allows a user to create a slide show which is personalized by the user's interactions with an digital image or digital images (referred to herein as "image" or "images"). The present methods and systems for personalized slide show generation receive user interactions with a presented image or images and use these interactions to generate an interaction script. One example of a user interaction is a visual display interaction, such as, for example, a visual interaction received from a user utilizing a user interaction device for panning to a personally interesting portion of presented image or zooming in on a personally interesting portion of a presented image. Another example of a user interaction is an audio interaction associated with a presented image, such as, for example, an audio interaction received from a user utilizing an audio input device for: recording music to set a mood for a presented image; recording a verbal description about what is shown in a presented image; or recording a verbal description about what is shown in a portion of a presented image to which the user has panned to or zoomed upon. Yet another example of a user interaction is a time based interaction, such as for example a time base interaction received based on: a time that a visual display interaction occurs; a time that an audio interaction occurs; or associated with length of time that a user views and/or interacts with one image relative to another image or one portion of an image relative to another portion of the image.

In the interaction script, a user interaction is associated with the image which was presented when the user interaction was generated. A personalized slide show generator then utilizes the interaction script, in conjunction with the image or images interacted with, to repeatedly generate a slide show from the image or images. In this manner, the slide show is personalized according to the user's previous interactions with the image or images which are displayed in the slide show. Furthermore, the same personalized slide show may be repeatedly generated from the slide show script and associated image or images.

The slide show script is storable as a separate entity from the image or images with which it is associated. This means that multiple slide shows can be generated from a particular image or set of images without saving the image, images, or modified versions thereof with each version of the slide show. As a result a significant savings in storage space is realized compared to traditional techniques for storing slide shows.

Example System for Personalized Slide Show Generation

Figure 2:
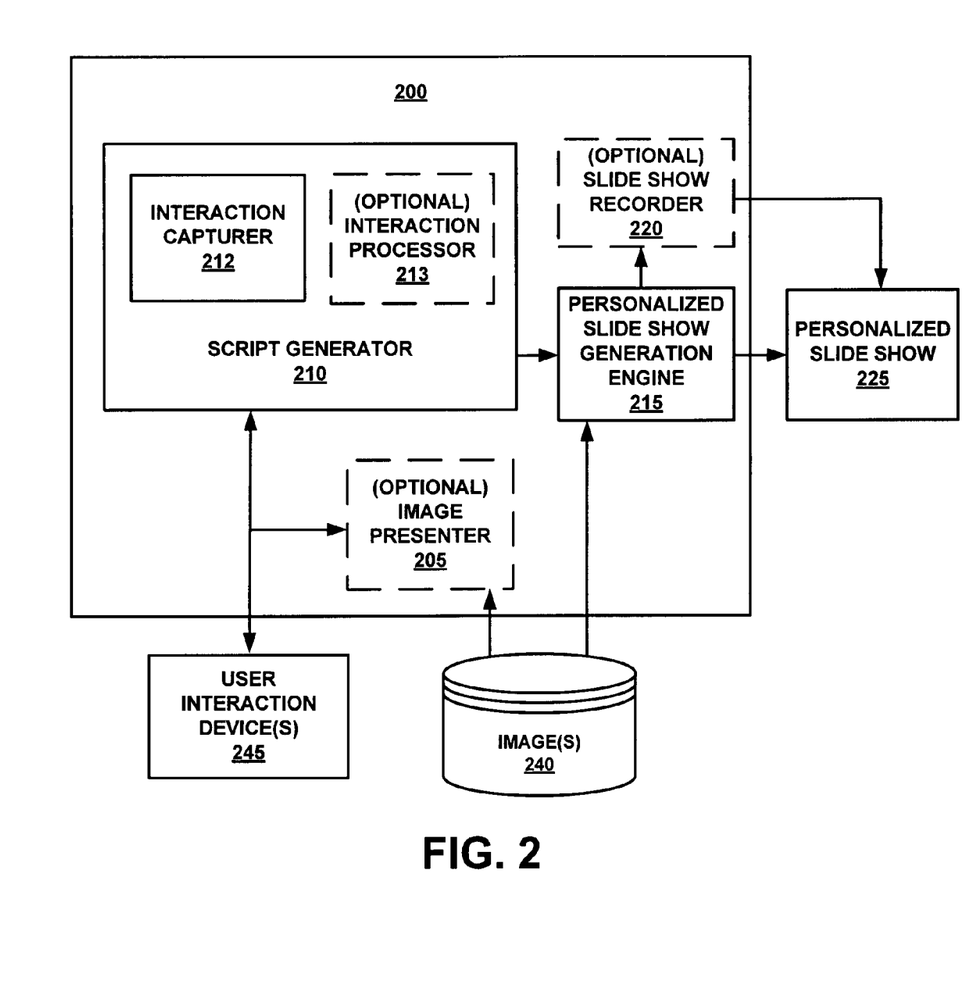
FIG. 2 is a block diagram of a system for personalized slide show generation, according to an embodiment of the present technology.

FIG. 2 is a block diagram of an example system 200 for personalized slide show generation, according to an embodiment of the present technology. System 200 generates a personalized slide show by generating an interaction script from received user interactions and by then integrating the interaction script with the image or images associated with the interaction script. System 200, as shown, is comprised of an optional image presenter 205, a script generator 210, a personalized slide show generation engine 215, and an optional slide show recorder 220.

Optional image presenter 205 is an image viewer used to open digital image files for viewing on a display device, such as display device 118. This can be performed in numerous well known ways, such as, for example in some automated order (such as by file name) or, for example, by offering a set of thumbnail images for a user to select at will.

As shown, image presenter 205 is coupled with an image storage 240, one or more user interaction devices 245, and script generator 210. Image presenter 205 decodes and presents an image or images from image storage 240 for viewing by a user, such as on display device 118, in a manner which is well known in the art of digital image manipulation. Image presenter 205 provides a necessary functionality for the operation of system 200. Therefore, in some embodiments, image presenter 205 is included as an integrated portion of system 200.

However, inclusion of image presenter 205 within system 200 is optional in embodiments in which components of system 200, such as script generator 210, are configured to work with an image presenter 205 that is external to system 200. For example, in one embodiment, system 200 is implemented as an application 124 running on computer system 100. In one such embodiment, image presenter 205 is external to system 200 as a resident portion of operating system 122 or as another application 124, and script generator 210 is configured to couple with external image presenter 205. One example of such an external image presenter 205 is the Picture and Fax Viewer included with the Microsoft Windows XP operating system. In general, whether internal or external to system 200, image presenter 205 retrieves digital images for display from image storage 240.

In various embodiments, image storage 240 is a storage location such as a flash memory card, a network assessed storage area, a data storage unit 112, a peripheral computer readable media 102, or other similar storage area or combination of such storage areas.

Script generator 210 is configured, in one embodiment, for employing a user interaction associated with an image to generate an interaction script. As shown in FIG. 2, script generator 210 comprises interaction capturer 212 and optional interaction processor 213. Script generator 210 is coupled with one or more user interaction devices 245, with image presenter 205, and with personalized slide show generation engine 215.

A user interaction device 245, for embodiments of the present technology, comprises any input device that a user can utilize to interact with a presented image. So, for example, in one embodiment a user interaction device 245 comprises a cursor control device such as cursor control device 116. Similarly, in one embodiment, an interaction device 245 comprises an audio input device such as audio input device 119.

The interactions which are recorded into an interaction script by script generator 210 are the subjective interactions of a user who is viewing, evaluating, and interacting with an image which is presented, for example on display device 118, by image presenter 205. The manner in which images are presented to a user for interaction is dependent on the nature and functionality of the image presenter 205 which is utilized. For example in one embodiment, image presenter 205 automatically presents images to a user one at time, such as, for example, sequentially from a folder of digital image files. In one embodiment, image presenter 205 allows a user to select the order in which to view and interact with the images, such as, for example, by selecting and opening a thumbnail image or a particular digital image file which a user desires to interact with. As shown in FIG. 2, script generator 210 is comprised of interaction capturer 212 and optional interaction processor 213.

Interaction capturer 212 is configured, in one embodiment, for providing an interaction interface which is accessible for receiving one or more user interactions from one or more user interaction devices. For example, in one embodiment, interaction capturer 212 operates in conjunction with image presenter 205 to display a user interface such as a set of selectable buttons, icons, or a controllable cursor associated with an image which is being presented by image presenter 205. In such an embodiment, interaction capturer 212 provides functionality which allows a user to interact with the presented image by manipulating the cursor or selecting the selectable icons or buttons with a user interaction device 245, such as cursor control device 116. For example, in one embodiment cursor control device 116 is a multimedia remote control, while in another embodiment cursor control device 116 is a computer mouse or some other means for cursor control.

Consider an embodiment where cursor control device 116 is, for example, a computer mouse with two buttons (left and right) and a scroll wheel. In one such embodiment, the user pans to a portion of a presented image by holding the left button down and moving the controllable cursor to a portion of the presented image which has personal interest to the user. This is an example of a visual display interaction associated with the presented image. Similarly, in one such embodiment depressing the right button allows a user to enable a recording capability so that an interaction device 245, such as audio input device 119 is enabled to receive audio inputs such as a conversational description of the image which is presently being presented to the user. This is an example of an audio interaction associated with a presented image. Likewise, in such an embodiment the user may zoom in on a portion of the image centered on the cursor by rolling the scroll wheel in one direction, and similarly zoom out by spinning the scroll wheel in the opposite direction. This is another example of a visual display interaction associated with the presented image. Thus, as an image is presented to a user by image presenter 205, interaction capturer 212 provides a means for enabling the use of one or more user interaction device 245 to capture and receive one or more user interactions with the presented image.

In one embodiment, script generator 210 generates an interaction script from the received user interaction(s) with the presented image or images. For example, in one embodiment where user interaction device 245 is a cursor control device 116, script generator 210 records positional movements of cursor control device 119 with respect to the presented image. For example, recording of the positional movements of a mouse which are associated with panning and zooming, provides an interaction script of a user's visual display interactions that are associated with a presented image. Likewise, recording a sound or a conversational description generated by a user and associated with an image or portion of an image provides an interaction script of a user's audio interactions associated with a presented image or portion thereof.

Similarly, in one embodiment, each recorded interaction is also tagged with a time label associated with when the interaction is received. This can be done in a variety of manners, such as, for example by receiving and recording a system clock time associated with an interaction. Such time based interactions allow, in one embodiment, replay of the interactions which are recorded in the interaction script in the same time frame as they were made by the user. In another embodiment, such time based interactions allows portions of the interactions in the interaction script to be replayed in a time frame that is scaled up or down by some multiple in proportion to the actual time that a user took to produce the original interaction or series of interactions with the image presented by image presenter 205.

Optional interaction processor 213 is configured, in one embodiment for post-processing some or all interactions which are captured by interaction capturer 212. In one embodiment, interaction processor 213 performs processing after an interaction is captured by interaction capturer 212, but prior to the captured interaction being recorded by script generator 210. In another embodiment, functionality of interaction processor 213 is included in personalized slide show generation engine 215 and used to process interactions which have already been incorporated into an interaction script.

As an example, in one embodiment, interaction processor 213 smoothes captured positional inputs through a filtering mechanism which removes undesirable jitter from the positional inputs. In one such embodiment, for example, a user's hand may be slightly shaky when providing a visual display interaction associated with a presented image, such as panning from one portion of the presented image to another portion of the presented image. As captured by interaction capturer 212, this panning path may be slightly jagged, for instance by occasionally varying several pixels from a smooth path. Thus, in one embodiment, interaction processor filters this slightly jagged path into a smooth panning path to be recorded into interaction script by script generator 210.

It is appreciated that interaction processor 213 can also perform many other types of interaction processing on raw interaction inputs or upon interactions recorded into an interaction script. For example, in one embodiment, interaction processor 213 measures hover time of a displayed cursor above particular portions of an image and uses such measured times to gauge the comparative personal relevance to a user of the different portions of the presented image. In one embodiment, such a comparative personal relevance is used to determine a length of time for an image or a portion of an image to be displayed. Such display time information also comprises a time based interaction associated with a presented image. In one embodiment, such derived display time information is associated with an image (or portion thereof) and recorded by script generator 210 into an interaction script. Personalized slide show generation engine 215 then utilizes this display time information stored in the interaction script to control display time of the associated image (or portion thereof) during a subsequent personalized slide show generated using the interaction script.

Personalized slide show generation engine 215 is coupled to script generator 210 and image storage 240. Personalized slide show generation engine 215 is configured, in one embodiment, for utilizing an interaction script and the image or images associated with the interaction to generate a personalized slide show. Personalized slide show generation engine 215 integrates the interaction script with each image associated with instructions in the script to create a slide show. One advantage of this integration is repeatability. For example, a user can create an interaction script by interacting a single time with a set of images from a vacation trip. Personalized slide show generation engine 215 integrates the interaction script with the images to replay the same personalized slide show as many times as a user desires to see it or play it. Similarly, another user can create a separate interaction script by interacting with the same images. This separate script is then useable to generate a second personalized slide show from the same set of images.

It is appreciated that an interaction script does not contain images, or altered versions thereof, but instead contains location information which indicates where each image associated with a particular user interaction or set of user interactions is stored. Thus, personalized slide show generation engine 215 integrates the user interaction(s) from the interaction script with the image or images interacted with by retrieving the images as required via a coupling to image storage 240. Personalized slide show generation engine 215 accesses and retrieves each image in the personalized slide show in accordance with image location information stored in the interaction script and associated with one or more instructions. This allows multiple interaction scripts for a particular image or set of images to consume considerably less storage space than multiple slide shows of such images would consume if generated by conventional means which store the images, or altered versions thereof, with every slide show.

Storage of the interaction script separately from the images interacted with also allows a personalized slide show to be comprised of images that are stored in and accessed from a variety of locations. For example, in one embodiment, personalized slide show generation engine 215 retrieves a first image of a slide show from a flash memory card of a digital camera, a second image is retrieved from a hard disk drive of a computer, a third image is retrieved from the disk drive of a second computer which is networked with the first computer, while a fourth image is retrieved from an internet web page.

In one embodiment, personalized slide show generation engine 215 outputs the generated personalized slide show 225 to a video display device, such as display device 118 or a similar display device. In another embodiment, the personalized slide show is coupled from personalized slide show generator generation engine 215 to optional slide show recorder 220.

Optional slide show recorder 220 is configured, in one embodiment, to record a received personalized slide show as a video file. For example, in one embodiment, slide show recorder 220 records the personalized slide show as a video file in a motion picture experts group (MPEG) compatible video file format. This allows the personalized slide show to be replayed by devices that to not have access to personalized slide show generation engine 215, the image files of the digital images referenced by an interaction script, or either. Furthermore, slide show recorder 220 provides a convenient means for storing a personalized slide show in a format which can be saved to a compact disk, a digital versatile disk, or the like and then shared with another person. Similarly, slide show recorder 220 provides a convenient means for storing a personalized slide show in a format which can easily be emailed or otherwise shared over a network with another location, person, or device.

Example Methods of Operation

Figure 3:
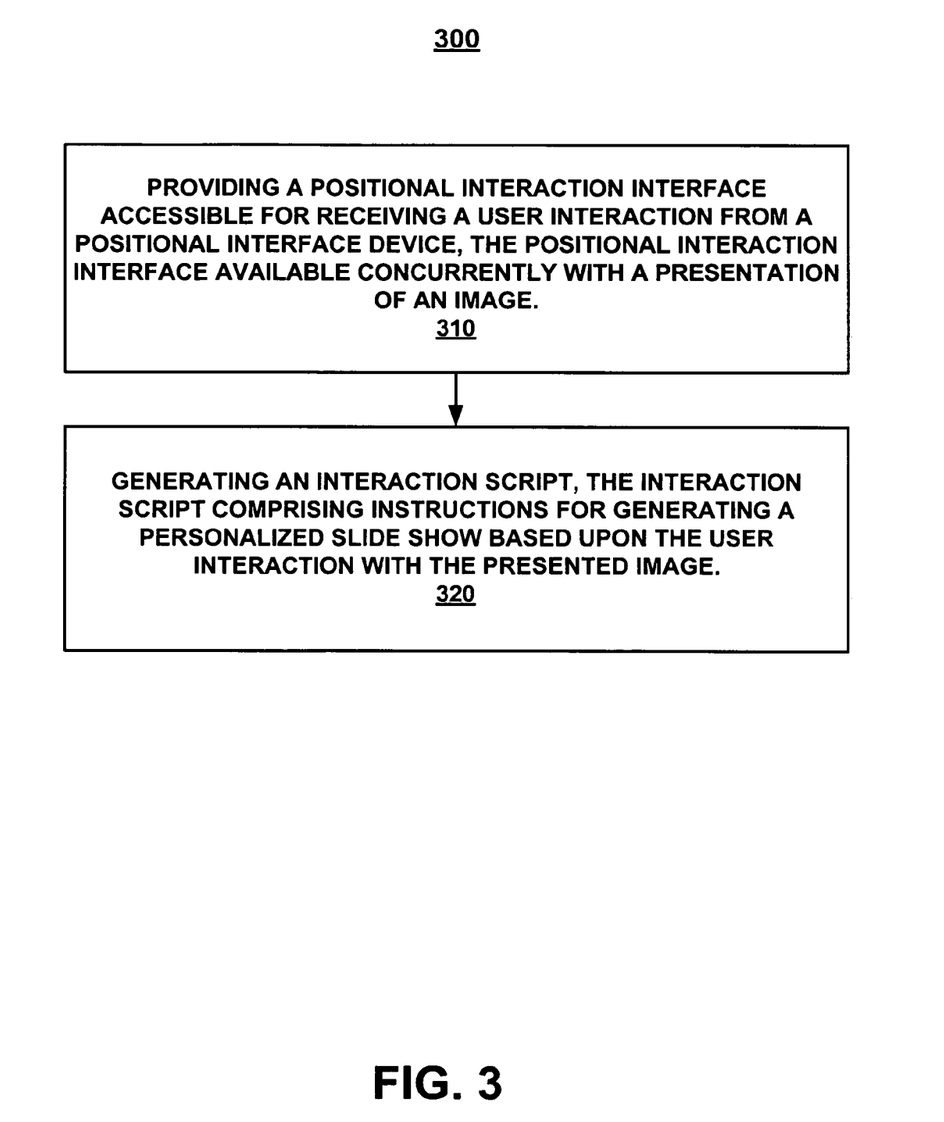
FIG. 3 is a flow diagram of a method for generating a personalized slide show, according to one embodiment of the present technology.
Figure 5:
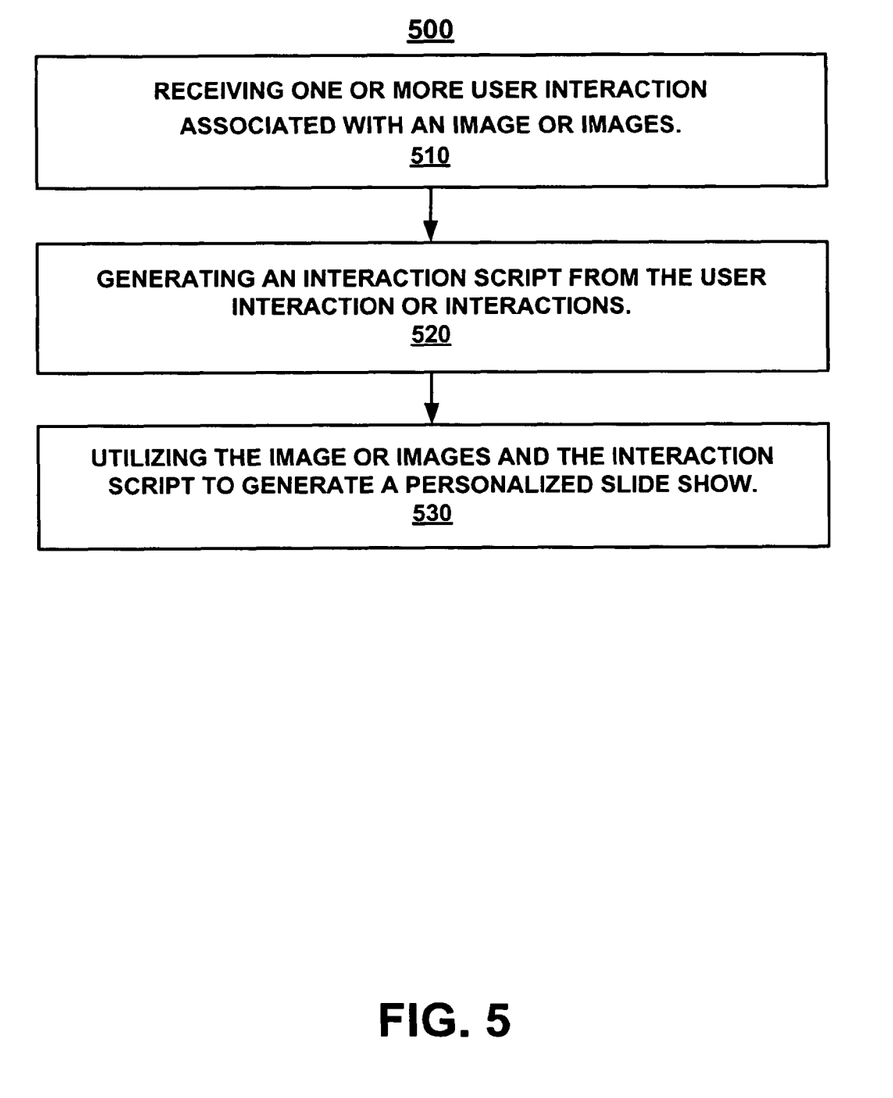
FIG. 5 is a flow diagram of a method for generating an interaction script, according to one embodiment of the present technology.

The following discussion sets forth in detail the operation of present technology through description of example embodiments. With reference to FIGS. 3 and 5, flow diagrams 300 and 500 each illustrate example steps used by various embodiments of the present technology. Flow diagrams 300 and 500 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 300 and 500, such steps are examples. That is, embodiments are well suited to performing various other steps or variations of the steps recited in flow diagrams 300 and 500. It is appreciated that the steps in flow diagrams 300 and 500 may be performed in an order different than presented, and that not all of the steps in flow diagrams 300 and 500 may be performed.

Generating an Interaction Script

FIG. 3 is a flow diagram 300 of a method, for generating an interaction script, in accordance with an embodiment of the present technology. Description of flow diagram 300 is facilitated by reference to elements shown in FIG. 1, FIG. 2, and FIG. 4.

At 310 of flow diagram 300, in one embodiment, the method provides a positional interaction interface accessible for receiving a user interaction from a position interface device; the positional interaction interface is available concurrently with a presentation of an image. In the presented technology, providing a positional interface comprises making a positional interaction interface such as, for example, a controllable cursor and/or selectable icons or buttons available for use and control, by a user, with respect to an image displayed on an image display device. In some embodiments, this comprises configuring a positional interface to work with an image presenter 205 which is external or internal to system 200, such that user interactions to manipulate a controllable cursor relative to an image presented by image presenter 205 are received and captured by interaction capturer 212. One embodiment of such a positional interface is illustrated by elements of FIG. 4.

Figure 4:
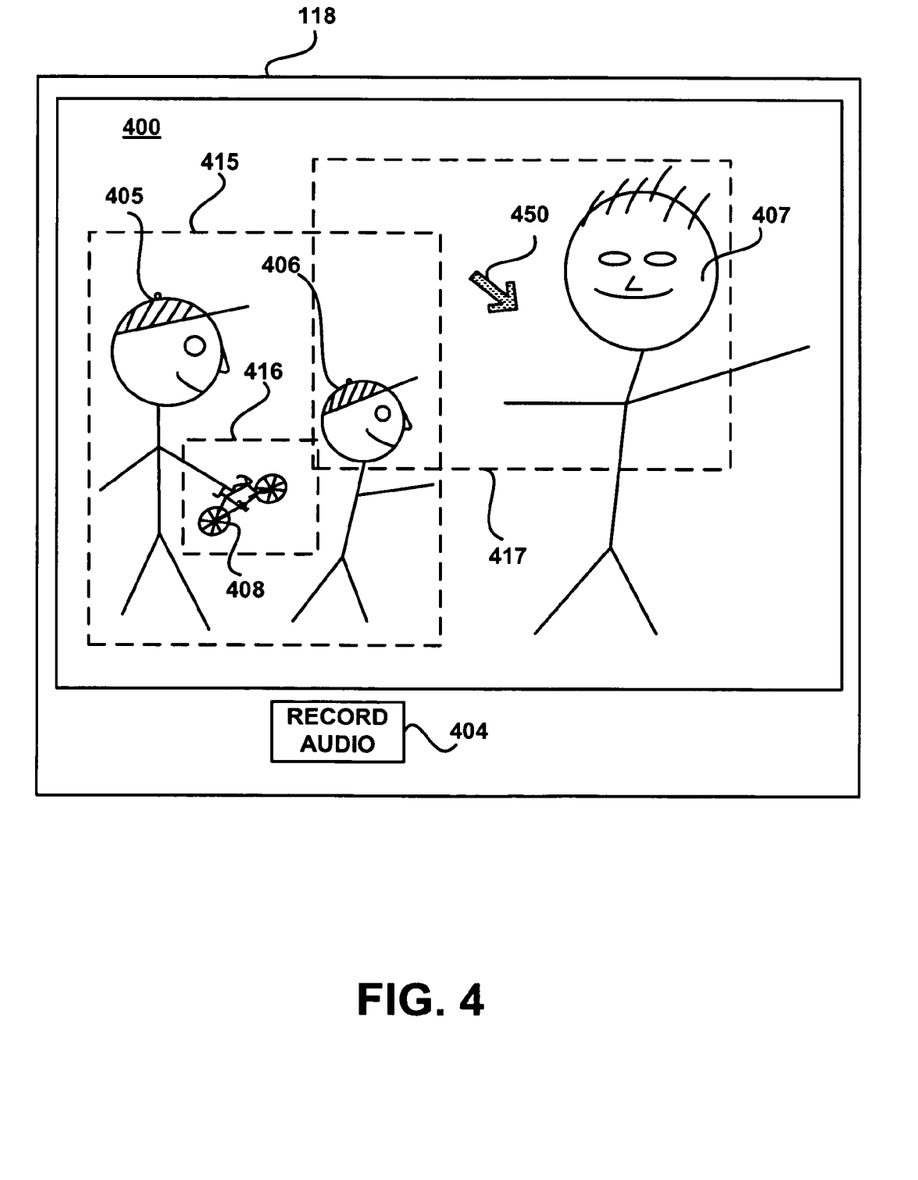
FIG. 4 is a diagram showing example interactions with a digital image, according to one embodiment of the present technology.

FIG. 4 is a diagram showing example interactions with a digital image 400, according to one embodiment of the present technology. In FIG. 4, a digital image 400 has been displayed on a display device 118 by image presenter 205. Image 400 comprises the display of a father 407 and two children 405 and 406. Child 406 is displayed holding a toy bicycle 408. It is appreciated that image 400, though shown as an illustration herein, represents a digital image displayed upon display device 118.

In FIG. 4, interaction capture 212 has provided a positional interaction interface in the form of controllable cursor 450. In one embodiment, controllable cursor 450 is manipulable with respect to image 400 through the use of a user interaction device 245 which is a positional interface device, such as cursor control device 116. For example, interaction capturer 212 superimposes controllable cursor 450 atop image 400 such that a user can manipulate with it by means of cursor control device 116. In response to such manipulation, a user interaction, such as a visual display interaction, audio interaction, and/or time based interaction is received by interaction capturer 212.

For purposes of example, and not of limitation, in one embodiment the positional interaction interface provided by interaction capturer 212 receives user interactions from a positional user interaction device 245, which comprises cursor control device 116 in the form of a two-button computer mouse with a scroll wheel. In such an example, a user interaction in the form of a visual display interaction, audio interaction, and/or time based interaction is received by interaction capturer 212 in response to a user manipulation of the computer mouse. For example, a visual display interaction is received by interaction capturer 212 when a user utilizes the computer mouse to position controllable cursor 450 at the center of region 415 and subsequently scrolls the scroll wheel to zoom in on region 415 such that the portion of image 400 represented by region 415 is centered within and enlarged on the display of display device 118.

In one embodiment, interaction capturer 212 also receives a time based interaction, for example, in the form of a time associated with the occurrence of this visual display interaction. This time based interaction, may be in the form of a time tag, associated with the visual display interaction.

Continuing this example, in one embodiment, the user clicks and holds the right button of the computer mouse to enable a recoding function via an audio user interaction device, such as audio input device 119. The user then says, for example, "These are my two sons, Jeff and Cliff," and then releases the right mouse button to disenable the recording function. Interaction capturer 212 associates the received audio interaction with image 400, or portion thereof (such as region 415), which is presently displayed with on the display of display device 118. In one embodiment, an interaction capturer 212 also receives a time based input, such as a time tag associated with the audio interaction.

In another embodiment, interaction capturer 212 further provides selectable buttons and/or icons such as "record audio" button 404 as part of the positional interaction interface. In such an embodiment, controllable cursor 450 is also manipulable to select such provided buttons and/or icons displayed within the display region of display device 118. In one such embodiment, the user enables and disenables the recoding function by positioning controllable cursor 450 above record audio button 404 and then clicking, for example, the right mouse button to enable or to disenable audio input. For example, when record audio button 404 is clicked to enable audio recording, interaction capturer 212 receives an audio interaction as an input from an interaction device 245, such as audio input device 119. Interaction capturer 212 associates the received audio interaction with image 400, or portion thereof (such as region 415), which is presently presented on the display of display device 118. In one embodiment, interaction capturer 212 also receives a time based input, such as a time tag associated with the audio interaction.

Continuing with the example, described above, after zooming to region 415, a user may then left click on the mouse and reposition controllable cursor 450 at the center of region 416, and then scrolls the scroll wheel to zoom onto region 416. In response to this action, interaction capturer 212 receives visual display interactions which positionally pan from the center of region 415 to the center of region 416, and then zoom to enlarge region 416. In one embodiment, a time based interaction is also received in conjunction with each of these visual display interactions. Similarly, a user may then right click the mouse and say, "This is Jeff's toy bicycle", in reference to toy bicycle 408 which is now displayed in zoomed region 416. Thus, interaction capturer 212 receives an audio interaction of, "This is Jeff's toy bicycle", and in one embodiment, a time based input associated with this audio interaction.

Continuing with the example described above, after zooming to region 416, a user may then zoom back out to display all of image 400, click on the left button of the mouse and reposition controllable cursor 450 at the center of region 417, then scroll the scroll wheel to zoom onto region 417. In response to these actions, interaction capturer 212 receives visual display interactions which positionally zoom out from region 416, pan from the center of region 416 to the center of region 417, and then zoom to enlarge region 417. In one embodiment, a time based interaction is also received in conjunction with each of these visual display interactions. Similarly, a user may then right click the mouse and say, "My son Cliff is about to jump into my arms", in reference to the actions of child 406 and father 407 which are now displayed as zoomed region 417. Thus, interaction capturer 212 receives an audio interaction of, "My son Cliff is about to jump into my arms", and in one embodiment, a time based input associated with this audio interaction.

At 320 of flow diagram 300, in one embodiment, the method generates an interaction script. The interaction script comprises instructions for generating a personalized slide show based upon the user interaction with the presented image. The interaction script and the instructions contained therein are generated by script generator 210 from user interactions received by interaction capturer 212. In one embodiment, the received user interactions are directly recorded as instructions in the interaction script, without any intermediate processing. While in another embodiment, some or all of the received interactions are processed by interaction processor 213 prior to being recorded as instructions in the interaction script. One previously described example of such processing is filtering. For example, a received visual display interaction to zoom into region 415 is filtered by interaction processor 213 to remove positional jitter prior to recording the positional information, such as a zoom factor, associated with zooming upon region 415 as an instruction in the interaction script.

Continuing the previous example associated with image 400, a visual display interaction such as zooming onto region 415 is recorded, for example as positional information in the interaction script. This positional information serves as instructions which personalized slide show generation engine 215 follows to recreate the user interactions (such as zooming into region 415) in the form of a personalized slide show. In one embodiment, this comprises storing x-y two-dimensional position information of the center of region 415 with respect to the pixels of image 400, and also recording third dimensional (z dimension) positional information such as a zoom factor associated with region 415.

Similarly, in one embodiment, this further comprises recording time based interactions received by interaction capturer 212, such as a time tag associated with the zooming onto region 415. For example, in one embodiment, if the zooming occurred at 1:05:59 pm (for instance, according to a clock device of system 100), script generator 210 records a time tag generated from this time into the interaction script. Thus the zooming positional information and the time tag information associated with region 415 and recorded by script generator 210 as instructions in the interaction script.

Likewise, an audio interaction received by interaction capturer 212, such as, "These are my two sons, Jeff and Cliff," is also stored in the interaction script by script generator 210. In one embodiment, a time based interaction is also received, for instance at the beginning of the receipt of the audio interaction, and stored by script generator 210 as an instruction in the interaction script. For example the time based interaction associated with the audio interaction, may comprise a time tag of 1:06:03 pm, which is stored in the interaction script and associated with the audio interaction, "These are my two sons, Jeff and Cliff."

Similarly, in this example, interaction capturer 212 receives a time based interaction, such as a time tag associated with the panning to the center of region 416. For example, in one embodiment, if the panning occurred at 1:06:10 pm (for instance, according to a clock device of system 100), script generator 210 generates a time tag instruction from this time based information, and records this time tag instruction into the interaction script. The panning positional information and the time tag information are associated with region 416 and recorded by script generator 210 as instructions in the interaction script.

In one embodiment, generating an interaction script involves generating an interaction script comprising instructions for synchronizing replay of other instructions, such as position instructions associated with visual display interactions and/or audio interactions. This enables personalized slide show generation engine 215 to replay the instructions generated from the user interactions such that interactions are recreated at the appropriate times in conjunction with the personalized slide show. A sequence of time tags, such as those described above, act as instructions that personalized slide show generation engine 215 uses to determine when to initiate or execute certain actions in an interaction script.

For example, such time tags provide instructions for how quickly to zoom into region 415, how long to stay zoomed on region 415, or when to replay an audio interaction stored in the interaction script and associated with region 415. Thus, based upon the time tag instructions recorded into the interaction script, as described in the example above, personalized slide show generation engine 215 has instructions to zoom onto region 415 at a time T. Further, four seconds later (T+4 seconds) personalized slide show generation engine 215 has instructions (via a time tag) to initiate the replay of the received audio interaction, "These are my two sons, Jeff and Cliff."

Such a user interaction and script generation sequence is repeated for each image presented by image presenter 205. With each presented image, script generator 210 records received user interactions into the interaction script. In one embodiment where such images are presented in an automated fashion by image presenter 205, a watch dog timer times out if no user input is received in a predetermined amount of time, such as, for example, five seconds. In one such embodiment, script generator 210 records no user interaction information relative to a timed out image into the interaction script. In one embodiment, such timed out images are merely displayed for a predetermined amount of time in a personalized slide show generated by personalized slide show generation engine 215. In one example, a particular user interaction input, such as for example, double clicking a mouse button causes an image to be skipped and no information associated with the image is recorded into the interaction script by script generator 210. Thus, a resulting personalized slide show generated from the interaction script will not display the skipped image.

Generating a Personalized Slide Show

FIG. 5 is a flow diagram 500 of a method, for generating a personalized slide show, in accordance with an embodiment of the present technology. Description of flow diagram 500 is facilitated by reference to elements shown in FIG. 1, FIG. 2, and FIG. 4.

At 510 of flow diagram 500, in one embodiment, the method receives one or more user interactions associated with an image or images. As previously described in conjunction with 310 of flow diagram 300 and as illustrated herein by example with reference to image 400, this comprises interaction capturer 212 receiving one or more user interactions such as a visual display interaction, an audio interaction, or a time based interaction associated with a digital image (or images) or portion thereof presented by image presenter 205.

In one embodiment, as previously described in conjunction with element 310 of flow diagram 300, such user interactions are received in response to an interaction interface which is provided to a user and is accessible for receiving a user interaction from a user interaction device 245. As previously described, such a positional interaction interface is available concurrently with a presentation of each presented image, such as image 400. In one embodiment, as shown in FIG. 4, such a positional interaction interface comprises a controllable cursor 450, and/or one or more selectable buttons or icons, such as "record audio" button 404. In one embodiment, user interaction device 245 comprises an audio input device 119, such as a microphone. In one embodiment user interaction device 245 comprises a cursor control device 116, such as a mouse, joystick, trackball, multimedia remote control, or other cursor control means.

At 520 of flow diagram 500, in one embodiment, the method generates an interaction script from the user interaction or interactions. Generation of an interaction script is consistent with the description provided herein with respect to element 320 of flow diagram 300. Thus, script generator 210 utilizes one or more user interactions received by interaction capturer 212 to generate an interaction script.

As previously described herein, in one embodiment, the interaction script comprises a script instruction generated from a visual display interaction associated with an image or images presented by image presenter 205. Following the example provided in conjunction with image 400, of FIG. 4, the interaction script instruction generated from one such visual display interaction comprises a positional instruction to zoom onto region 415. This positional instruction is generated from the visual display interaction received by interaction capturer 212 when the user centered controllable cursor 450 on region 415 and then manipulated a cursor control device 116 to zoom in on region 415.

In one embodiment, a received visual display interaction is processed by interaction processor 213 to remove positional jitter. For example, a visual display interaction of panning from region 415 to region 416 is received by interaction capturer 212. In one embodiment, this panning path is filtered such that the jagged panning input received from a user is translated into a smooth positional panning instruction which is then recorded into the interaction script by script generator 210.

As previously described herein, in one embodiment, the interaction script comprises a script instruction generated from an audio interaction associated with an image or images presented by image presenter 205. Following the example provided in conjunction with image 400, of FIG. 4, the interaction script instruction generated from one such received audio interaction comprises an instruction to replay a recorded audio interaction of, "These are my two sons, Jeff and Cliff", which is generated from the audio interaction received from a user in association with zoomed region 415.

As previously described herein, in one embodiment, the interaction script comprises a script instruction generated from a time based interaction associated with an image or images presented by image presenter 205. Following the example provided in conjunction with image 400, of FIG. 4, the interaction script instructions generated from such time based interactions comprise: a time tag instruction associated with the visual display interaction of zooming onto region 415; a time instruction associated with replay a recorded audio interaction of, "These are my two sons, Jeff and Cliff"; and a time tag instruction associated with the visual display interaction of panning to the center of region 416. In one embodiment, personalized slide show generation engine 215 interprets these instructions to initiate the replay of the recorded audio four seconds after zooming into region 415 of image 400, and then to pan to the center of region 416 seven seconds after playing the recorded audio interaction.

At 530 of flow diagram 500, in one embodiment, the method utilizes the image or images and the interaction script to generate a personalized slide show. In one embodiment personalized slide show generation engine 215 accomplishes this by retrieving a digital image (or images) associated with one or more instructions in the interaction script. Each digital image is retrieved from image storage 240 and then integrated with its associated instructions in the interaction script to create a personalized slide show (or a portion of a personalized slide show in the case where the interaction script comprises instructions associated with more than one image). In one embodiment, generating a personalized slide show comprises personalized slide show generating engine 215 outputting the integrated image(s) and script instruction(s) as a personalized slide show 225 on a display device, such as display device 118.

Consider, image 400 of FIG. 4 and the user interactions described herein in reference to regions 415, 416, and 417. Following this example, in one embodiment, personalized slide show generation engine 215 integrates image 400 along with the interaction script generated from interactions with image 400 to generate personalized slide show 225. For example, such a personalized slide show would start by displaying image 400. Region 415 is then zoomed in upon. Commentary of, "These are my two sons, Jeff and Cliff" is played. The display then zooms in on region 416. Commentary of, "This is Jeff's toy bicycle", is played. The display then pans and zooms to region 417. Commentary of, "My son Cliff is about to jump into my arms", is played. In an embodiment where image 400 is the only image described by the interaction script, the slide show then ends. In an embodiment where other images are described by the interaction script, the slide show then continues by presenting each of those images in a similar personalized fashion in accordance with the interaction script.

In one embodiment, generating a personalized slide show comprises personalized slide show generating engine 215 outputting the integrated image(s) and script instruction(s) to optional slide show recorder 220, which records the outputs of personalized slide show generation engine 215 as a video file. For example, in one embodiment, slide show recorder 220 records the outputs of personalized slide show generator as a Motion Picture Experts Group compatible video file, which can be saved for example to a hard disk drive, or stored on portable media such as a compact disk or a digital virtual disk for later replay as a personalized slide show 225.

Although the subject matter of the present technology has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented personalized slide show generation system, said system comprising:
   a script generator, said script generator configured for employing a user interaction associated with an image to generate an interaction script, said interaction script comprises a recording of said user interaction to include a recording of a positional movement received from a user interaction device with respect to a visual display of said image and a recording of a time base associated with actual time spent during said user interaction; and
   a personalized slideshow generation engine coupled to said script generator and configured for utilizing said image and said interaction script to generate a personalized slide show, said personalized slideshow comprises a replay, in accordance with said time base, of said recording of said user interaction in conjunction with presentation of said image,
   said image is not required to be associated with any slide show until said personalized slide show is generated and generation of said personalized slide show does not require any content that is defined prior to occurrence of said user interaction.

2. The system of claim 1, wherein said script generator further comprises:
   an interaction capturer, said interaction capturer configured for providing an interaction interface which is accessible for receiving said user interaction from said user interaction device.

3. The system of claim 2, wherein said user interface comprises:
   a cursor controllable relative to said visual display of said image.

4. The system of claim 1, wherein said script generator further comprises:
   an interaction processor, said interaction processor configured for filtering positional jitter from said positional movement user interaction.

5. The system of claim 1, further comprising:
   a slide show recorder coupled with said personalized slide show generation engine, said slide show recorder configured for converting said personalized slide show into a video file.

6. The system of claim 1, wherein said user interaction further comprises:
   an audio interaction associated with said visual display of said image.

7. A method for generating a personalized slide show, said method comprising:
   receiving a user interaction associated with an image;
   generating an interaction script from said user interaction, said interaction script comprises a recording of said user interaction to include a recording of a positional movement received from a user interaction device with respect to a visual display of said image and a recording of a time base associated with actual time spent during said user interaction; and
   utilizing said image and said interaction script to generate a personalized slide show, said personalized slideshow comprises a replay, in accordance with said time base, of said recording of said user interaction in conjunction with presentation of said image,
   said image is not required to be associated with any slide show until said personalized slide show is generated and generation of said personalized slide show does not require any content that is defined prior to occurrence of said user interaction.

8. The method as recited in claim 7, further comprising:
   providing a positional interaction interface which is accessible for receiving said user interaction from said user interaction device, said positional interaction interface available concurrently with said visual display of said image.

9. The method as recited in claim 7, further comprising:
   processing said user interaction by filtering said positional movement to remove positional jitter.

10. The method as recited in claim 7, wherein said utilizing said image and said interaction script to generate a personalized slide show further comprises:
    outputting said personalized slide show to a display device.

11. The method as recited in claim 7, further comprising:
    recording said personalized slide show as a video file.

12. The method as recited in claim 7, wherein said generating an interaction script from said user interaction comprises:
    generating an interaction script instruction from an audio interaction associated with said image.

13. A method for generating an interaction script, said method comprising:
    providing a positional interaction interface accessible for receiving a user interaction from a positional interface device, said positional interaction interface available concurrently with a presentation of an image; and
    generating an interaction script, said interaction script comprising instructions for generating a personalized slide show based upon said user interaction with said presented image, wherein said interaction script comprises a recording of said user interaction to include a recording of a positional movement received from a user interaction device with respect to a visual display of said image and a recording of a time base associated with actual time spent during said user interaction,
    said image is not required to be associated with any slide show until said personalized slide show is generated and generation of said personalized slide show does not require any content that is defined prior to occurrence of said user interaction.

14. The method as recited in claim 13, wherein said generating an interaction script further comprises:
    generating said interaction script comprising an instruction for synchronizing replay of an audio interaction in conjunction with said personalized slide show.

* * * * *

UNITED STATES PATENT AND TRADEMARK OFFICE
CERTIFICATE OF CORRECTION

| | | |
|---|---|---|
| PATENT NO. | : 7,987,423 B2 | Page 1 of 1 |
| APPLICATION NO. | : 11/546623 | |
| DATED | : July 26, 2011 | |
| INVENTOR(S) | : Peng Wu et al. | |

It is certified that error appears in the above-identified patent and that said Letters Patent is hereby corrected as shown below:

In column 8, line 44, before "generation" delete "generator".

Signed and Sealed this
Twentieth Day of March, 2012

David J. Kappos
*Director of the United States Patent and Trademark Office*